March 13, 1928. 1,662,063
C. T. HOLCROFT ET AL
APPARATUS FOR FIRING CERAMIC AND OTHER PRODUCTS
Filed Dec. 1, 1924 11 Sheets-Sheet 1
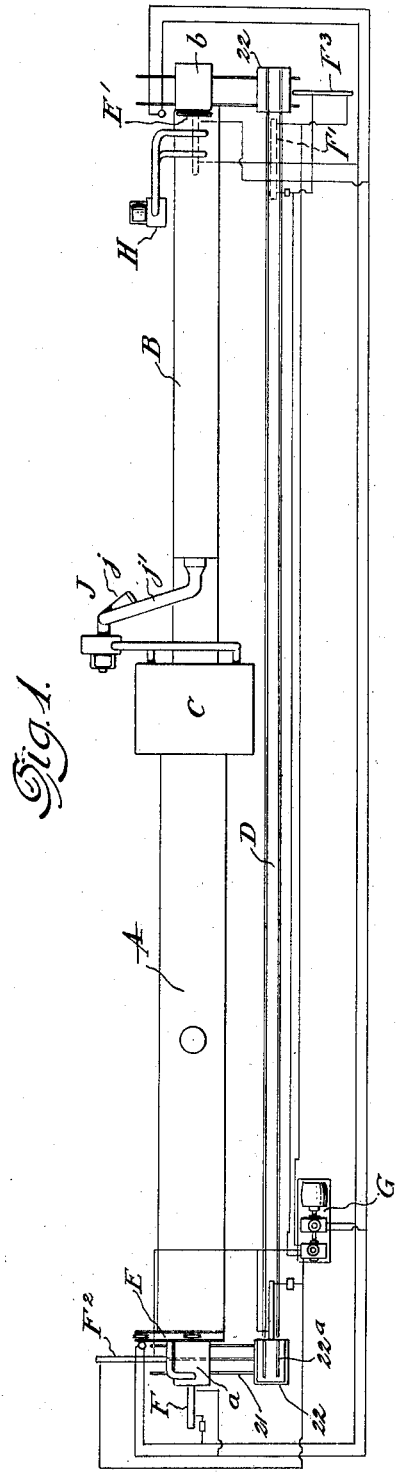
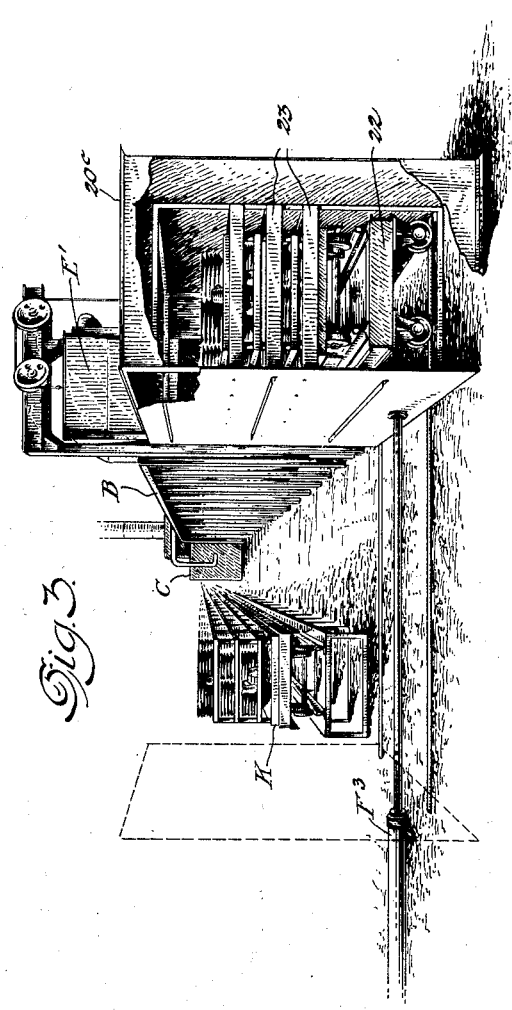
Inventors:
Charles T. Holcroft
Charles E. Doll
By
Attorneys.

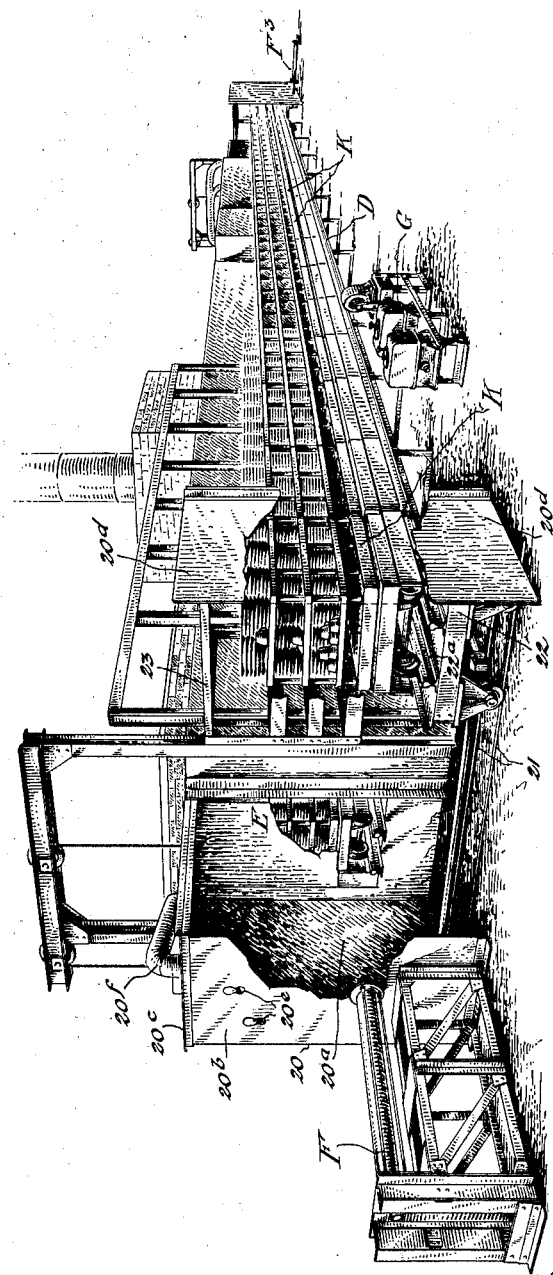

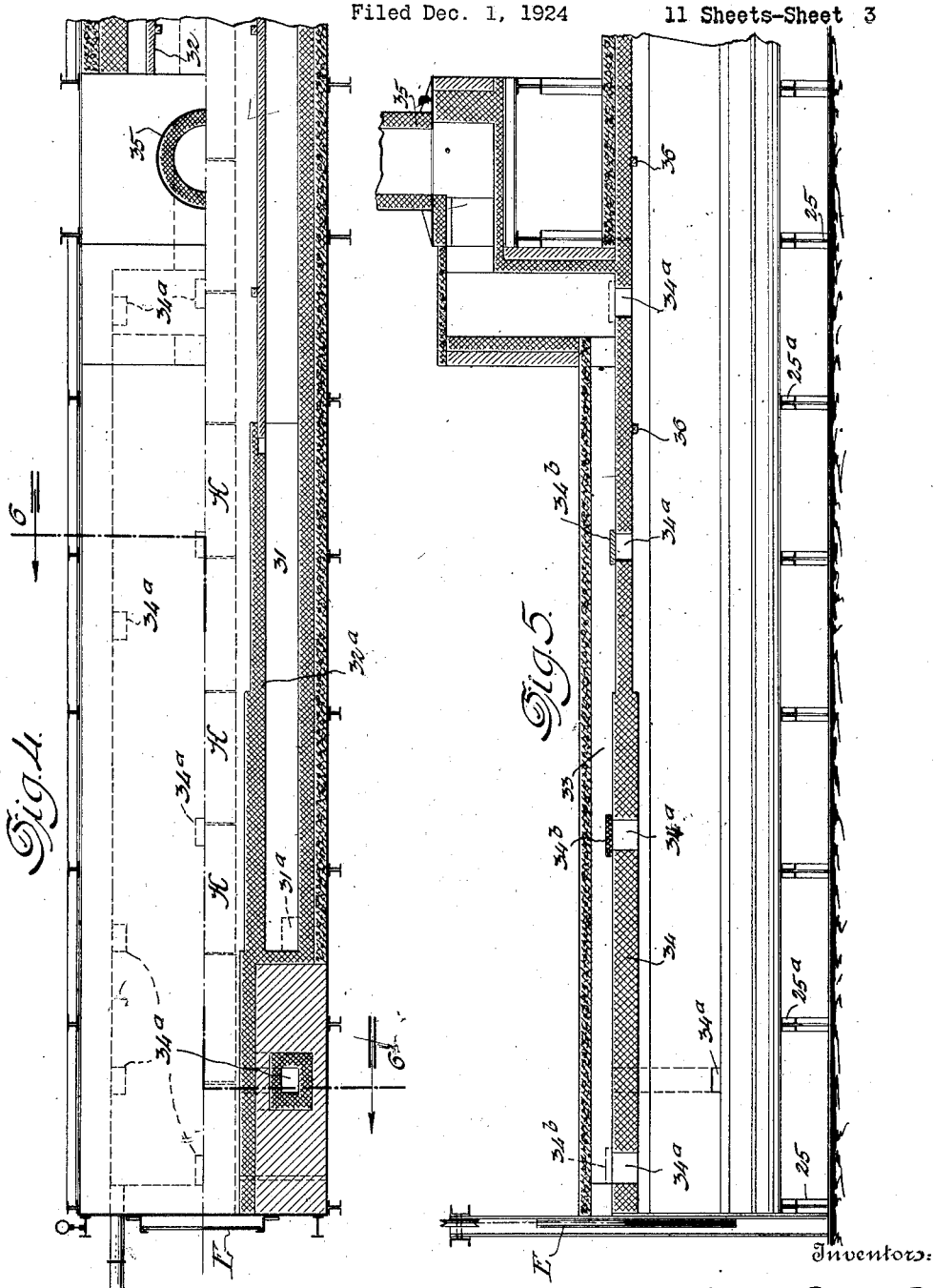

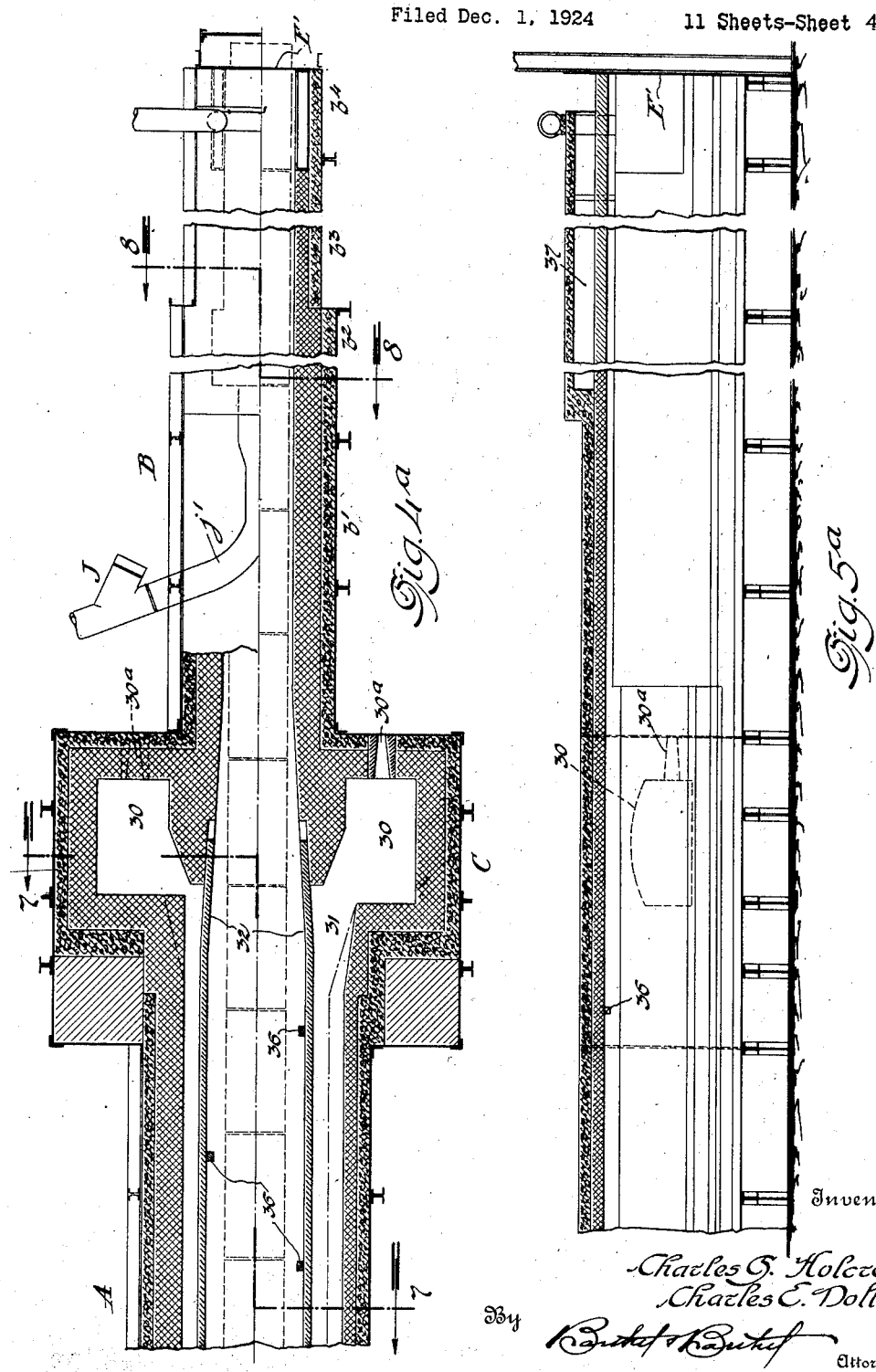

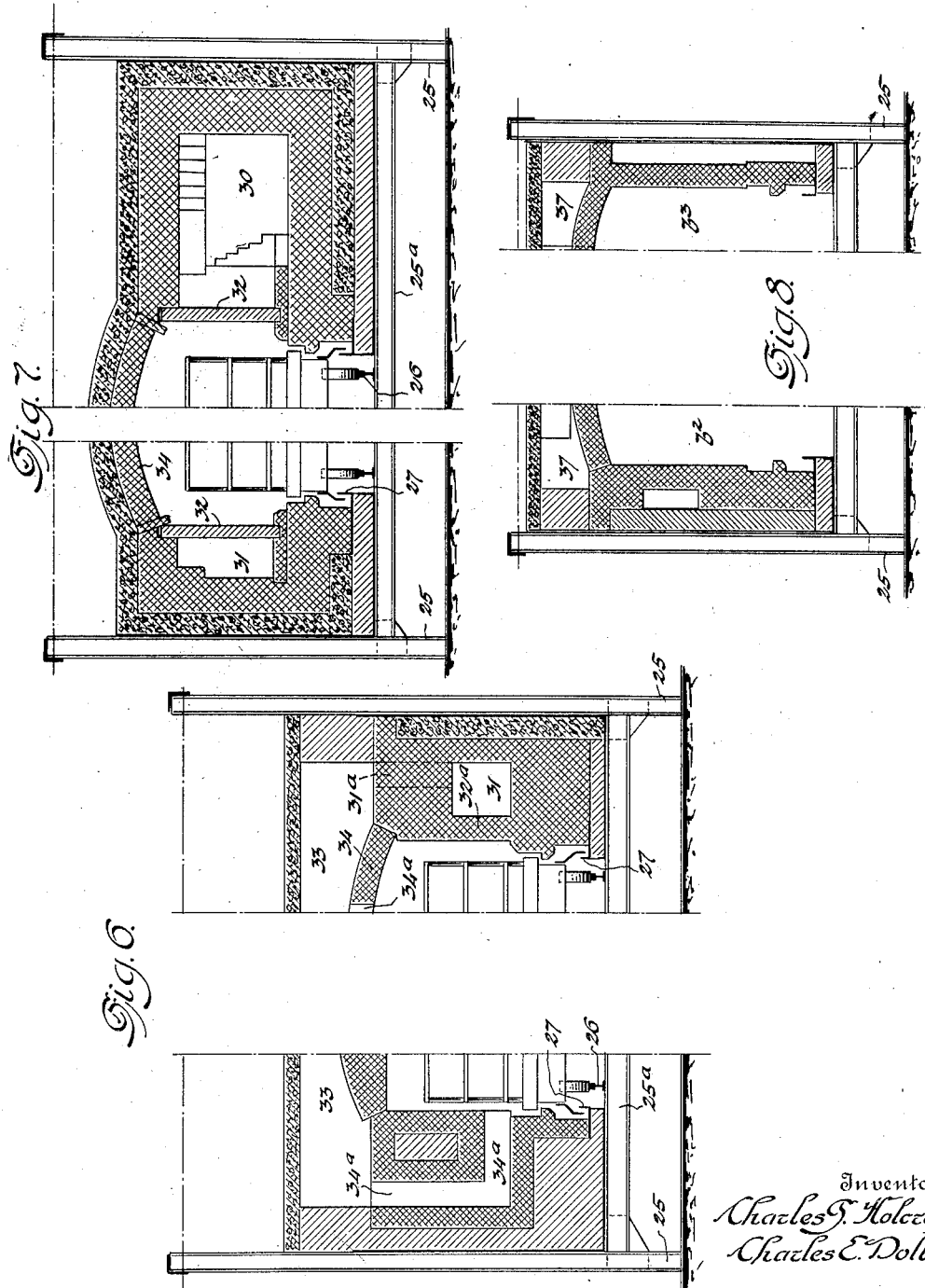

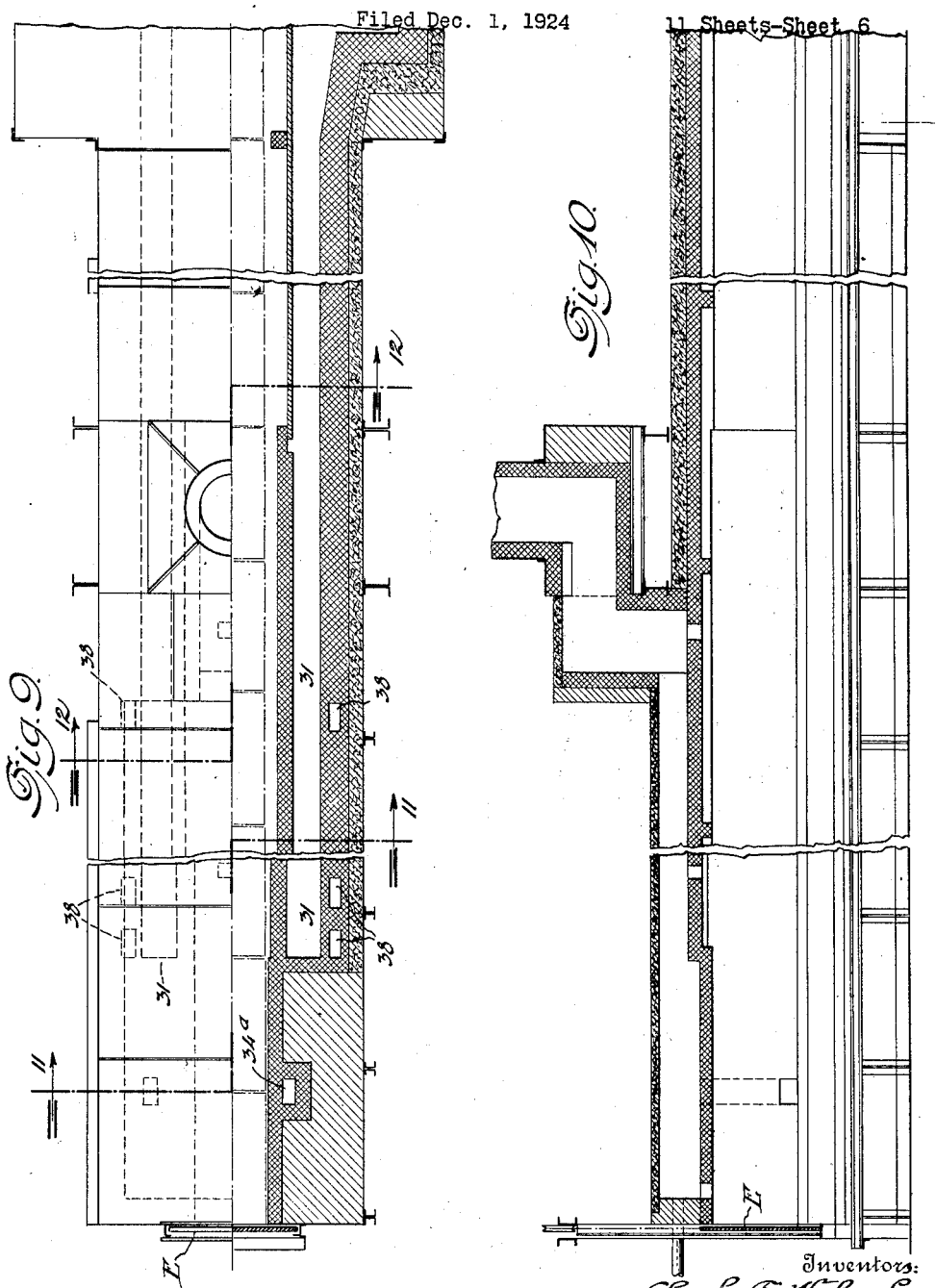

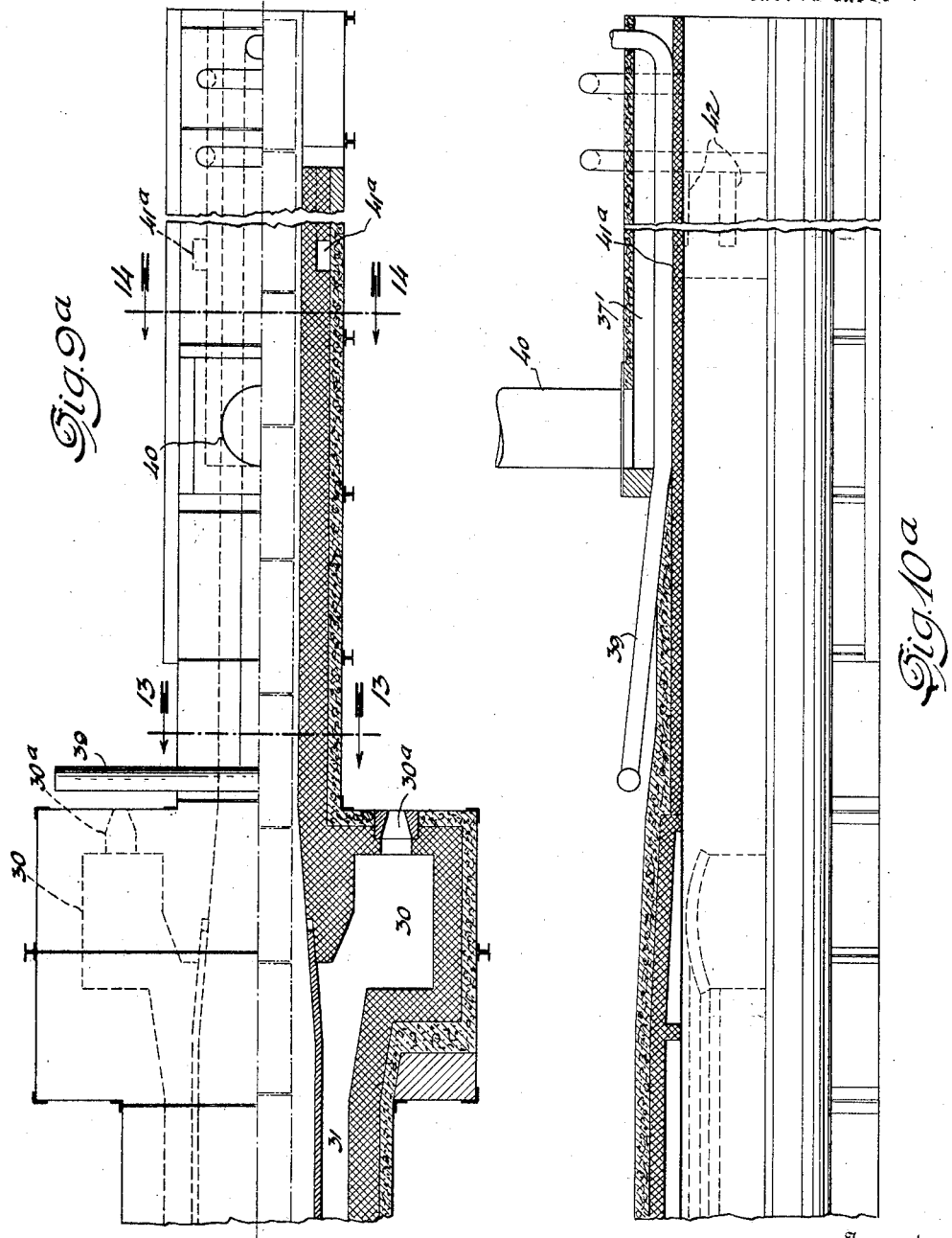

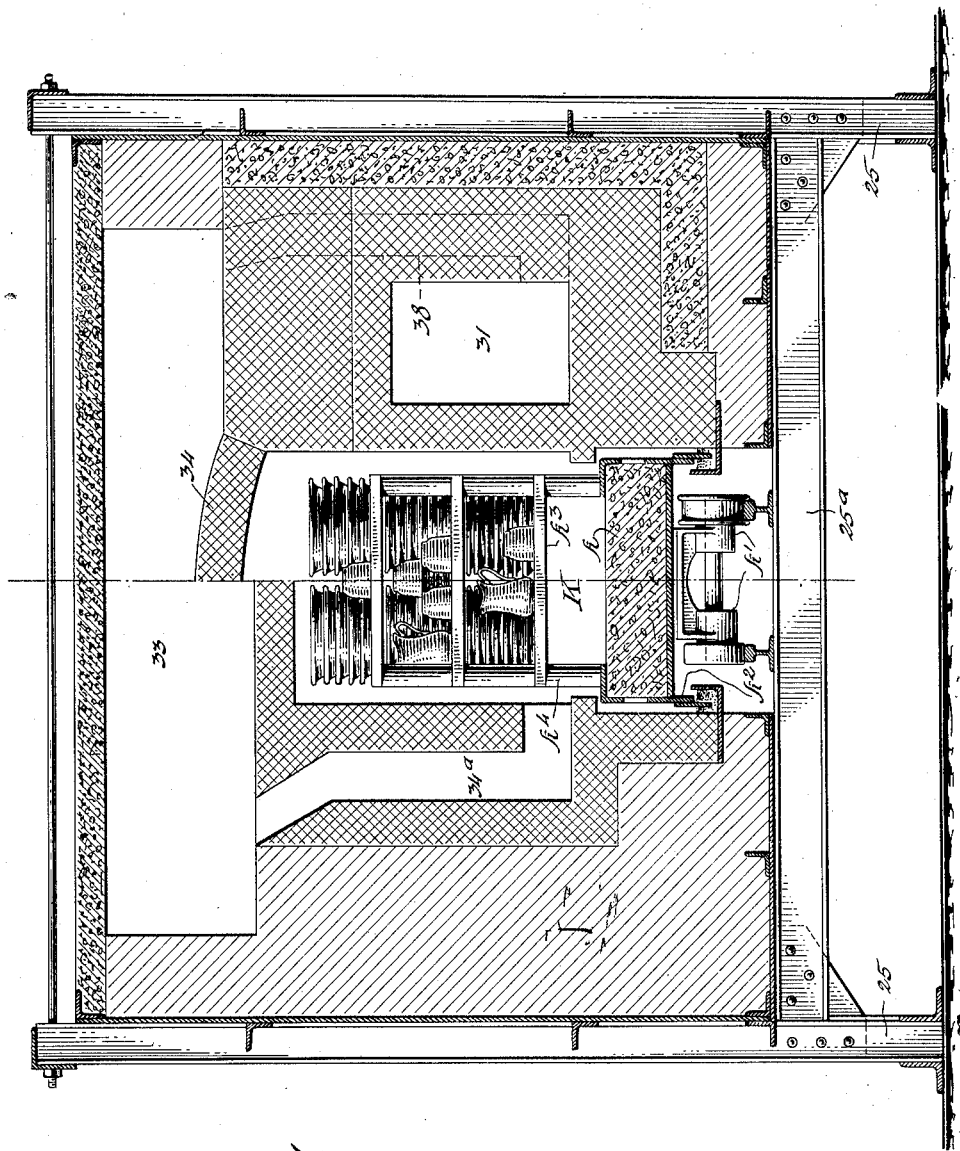

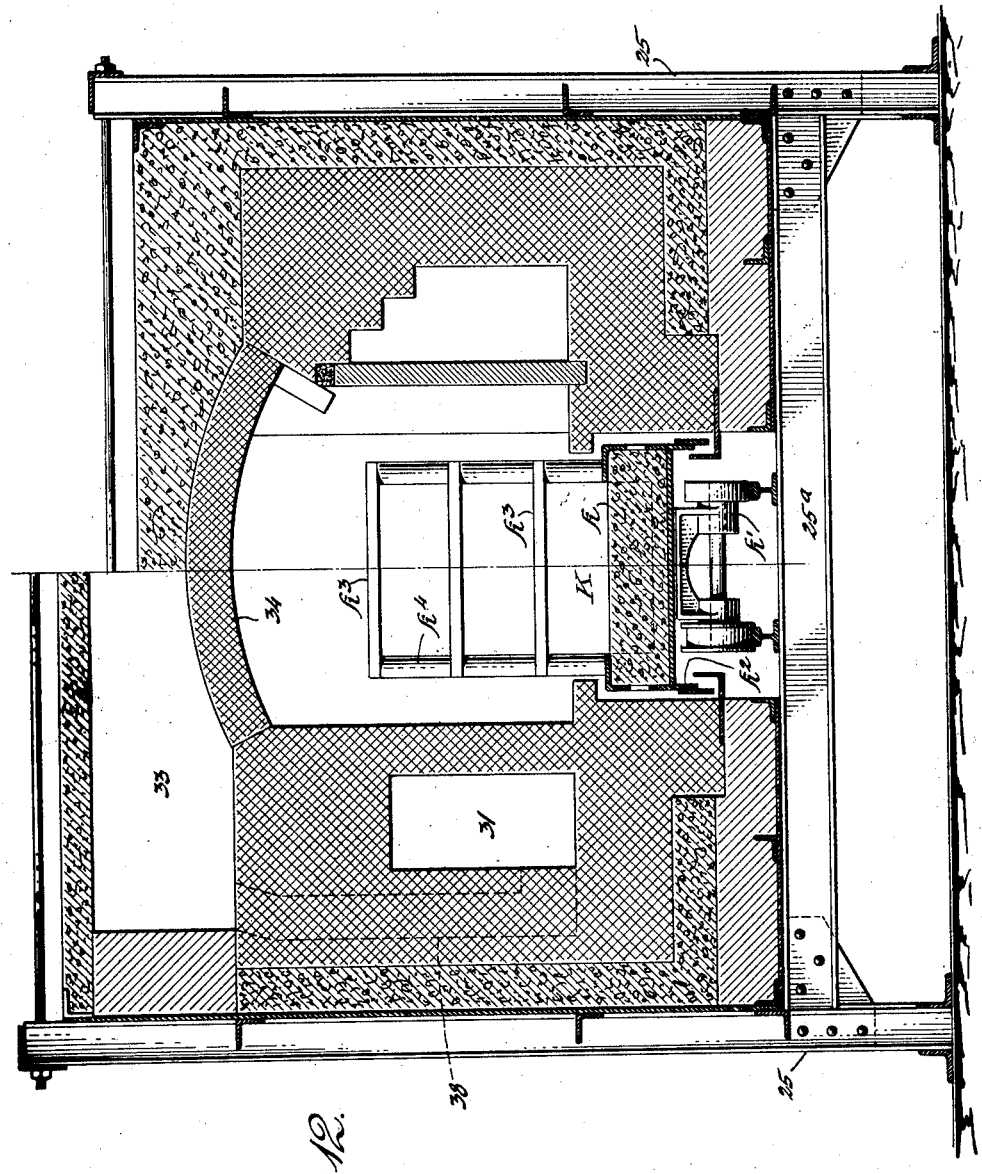

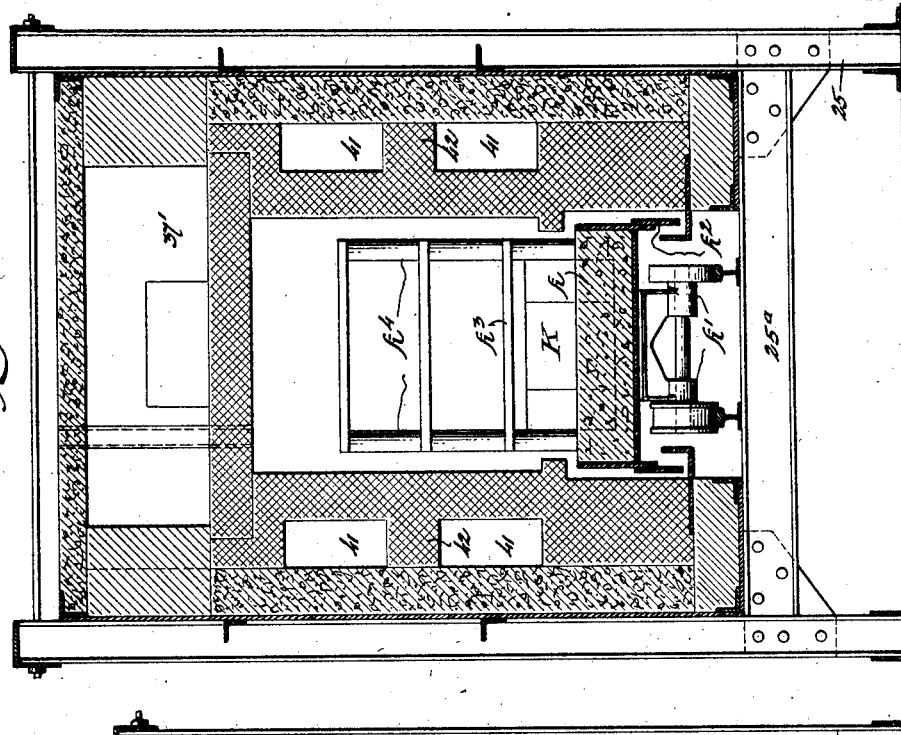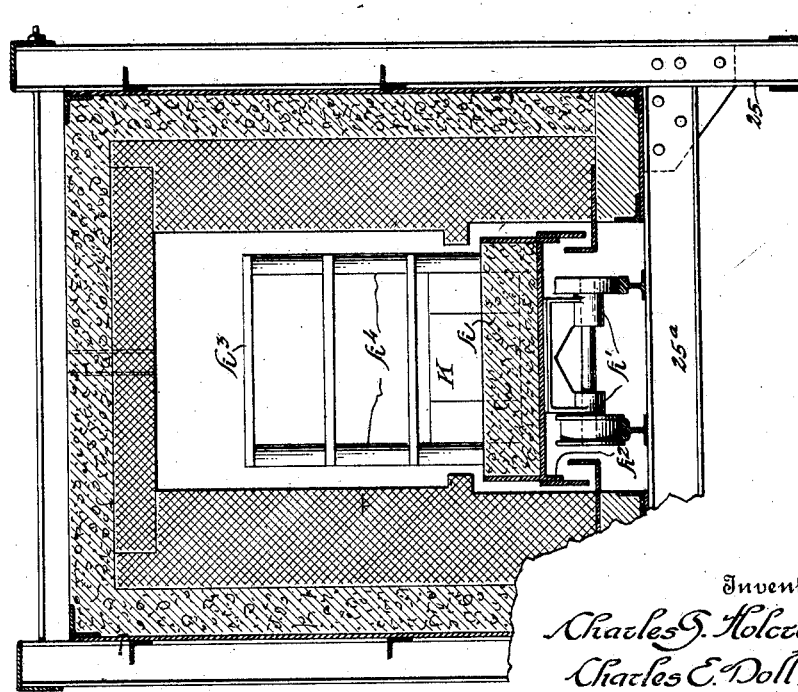

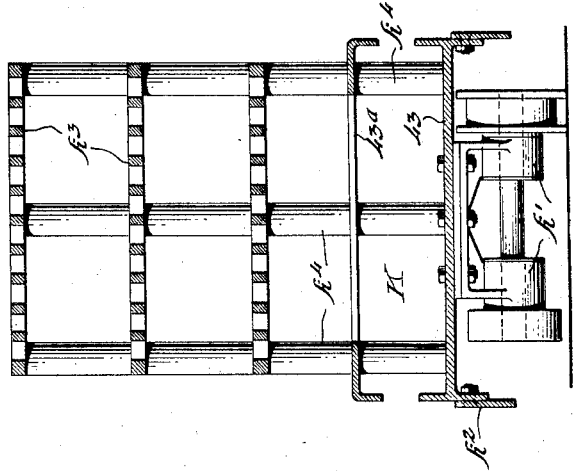
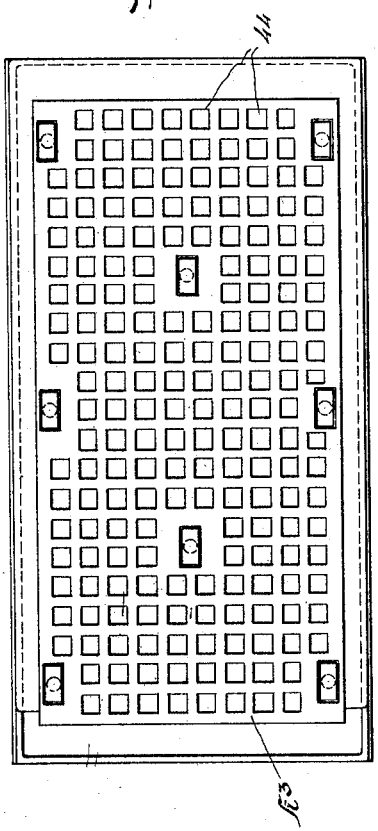
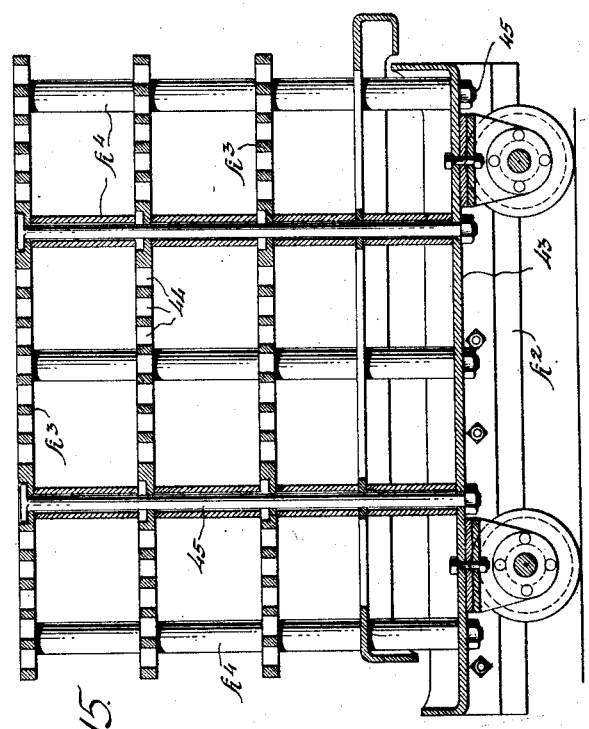

Patented Mar. 13, 1928.

1,662,063

UNITED STATES PATENT OFFICE.

CHARLES T. HOLCROFT, OF DETROIT, AND CHARLES E. DOLL, OF MOUNT CLEMENS, MICHIGAN.

APPARATUS FOR FIRING CERAMIC AND OTHER PRODUCTS.

Application filed December 1, 1924. Serial No. 753,084.

This invention relates to improvements in the art of firing ceramic and other products, and more particularly to the firing of decorated ceramic ware, the invention pertaining more particularly to apparatus by which the firing activities can be produced in simple and efficient manner.

While the invention may be used in various connections, it is especially adapted for use in connection with the firing of ceramic ware, such for instance, as that commercially known as "dinner" and "art" ware, and hence, for the purpose of explaining the invention, it is illustrated and described in a form which is particularly adapted for use in the firing of such ware, and especially in that stage of the formation of the ware in which applied decorations are fired to place them as permanent parts of the ware. This latter stage is one which carries many problems which must be met to provide for successful and efficient results, and because of this condition, the disclosure of the invention in this manner will permit its advantages to be more clearly understood.

The present invention is designed more particularly to carry out the methods set forth in our companion application filed May 12, 1924, Serial No. 712,561, which has become Patent 1,620,022, the apparatus of the said application being presented as of simple form, whereas the apparatus of the present application is designed to meet the conditions of a plant designed to operate under production or capacity conditions with a large output, thus enabling the cost of operation to be greatly reduced. And in order to better understand the characteristics of the present invention, a brief statement is made of the underlying features of the methods which the present invention are to carry out.

Ceramic ware of this kind is generally produced in three stages. The initial stage is that which takes the raw materials and, through admixture and treatment, produces the embryo shaped piece of ware, dried of most of its moisture, and subjects this to the action of a firing cycle during which the moisture is eliminated, the ingredients gradually fused to set up the desired chemical reactions between the ingredients to produce the desired product, cooling of the piece of ware succeeding the fusing or "firing" action. The product of this stage is known as "bisque" ware.

The second stage involves the production of the glazed surface on the "bisque" ware, and during this stage the bisque ware is first coated with the materials which produce the glaze, after which the coated bisque is subjected to a firing cycle which fuses the materials of the coating and fuses the coating with the surface of the embryo bisque product, the piece of ware then being cooled as a part of the firing cycle. If the piece of ware is to receive no decorations, the product of this stage provides the finished ware; if decorations are to be applied, a third stage is employed.

The third stage includes the decorating of the ware by the use of metal or mineral colors, these being applied by painting or by the decalcomania process, after which the decorated ware is subjected to a third firing cycle which serves to fuse the colors in position on the ware; when fused, the ware is cooled, and produces the finished piece of ware.

In each of the stages, the firing cycle is made up of a zone of gradually increasing temperatures to a predetermined peak temperature, and then a zone of gradually-decreasing temperatures; but the peak temperature of the different stages differs. For instance, the peak temperature of the first stage is approximately 2400° F.; that of the second stage is approximately 2200° F., while that of the third stage is approximately 1500° F., these temperatures being required to produce the desired action which the stage is to provide. For instance, in the first stage, the chemical reactions are to be set up and completed, and the action must be throughout the piece of ware; in the second stage, the chemical reactions to produce the glaze must be set up and the surface of the bisque be prepared for the fusing of the glaze upon it, but the chemical reactions of the body of the piece of ware are not changed from those produced during the first stage; the third stage deals with the fusing of the colors and the setting of these upon or in the glaze; metal colors, such as gold, do not unite with the glaze, while mineral colors tend to unite or "sink in" the glaze.

The peak temperature of the second stage does not reach that of the first stage, but it will be readily understood that within the temperature range of the second stage the action of the heat is generally similar to that of the first stage, excepting that the heat is acting on completed chemical reactions in the second stage while it produces these reactions in the first stage. And, in the third stage this same general condition is present with respect to the body of the ware within the temperature ranges of the stage, but the peak temperature is considerably lower, so that the body of the ware does not pass through all of the conditions found on the first and second stages, the peak temperature of the third stage being determined by the fusing temperatures of the colors being applied and not by the ware itself.

The temperature changes whether in the ascending or descending direction, must be gradual in each of the stages, due to the fact that conditions of expansion and contraction of the ware are present, and it is essential that proper compensation for expansion and contraction be had as the temperatures change. If the change be at too rapid a rate, strains and stresses are set up which tend to shatter the ware, this being especially true during the temperature range which is generally termed the "tender" or critical zone—ranging between 300° F. and 1600° F.; within this zone care must be taken to permit proper compensation for temperature changes in order to prevent the strains and stresses from shattering the ware.

One effect on the ware being fired is that of changing its color as the temperature varies. In the kiln, the lower temperatures present the ware as of a "black" color—that is, a color which does not indicate the presence of material heat; as the temperature increases, this changes to a dark red, then to a light red and finally to a yellow-red color; the peak temperature of the first stage is in the latter (yellow-red) color zone, while that of the second stage is in the light red color zone—the peak temperature of the third stage is within the dark-red color zone. The change in color of the ware in this way is generally used for indicating purposes. During the descending temperatures these colors appear in the reverse order. And it will be understood, of course, that the dark red color is present in each stage, the light red in the first and second stages, and the yellow-red only in the first stage.

The presence of the "tender" or critical zone provides an additional problem in the third stage not present in the first and second stages. This problem is produced as the ware reaches the peak temperature and then begins the descending progression; during the ascending range, the conditions of expansion have been present; reaching the peak temperature point, expansion changes to contraction of the ware, so that the action on the ware itself becomes changed. In the first and second stages this change occurs after the ware has passed through the "tender" zone on the ascending scale, so that in the decreasing-temperature direction the contraction activity has become well established before the ware enters the "tender" zone. In the third stage, however, this condition is changed, since this reversal takes place within the "tender" zone itself, with the result that the conditions at this particular time are critical—the expansion activity must be brought to an end and the contraction activity begun, and the change must be had without setting up strains and stresses in the ware itself such as would tend to shatter the ware. Because of this condition, the third stage presents a number of difficulties which are not present in the first and second stages, and the kiln structure for this stage must be constructed to meet these difficulties in order to prevent setting up loss of ware through shattering, etc.

Each of the firing cycles are conducted generally under "muffle furnace" conditions, in that the products of combustion are, as far as possible, kept from direct contact with the ware. In the first and second stages, this result is generally obtained by the use of "saggers", into which the ware is placed, the sagger closed, and subjected to the temperatures in a suitable kiln, the products of combustion generally circulating about the sagger and thus producing the temperature conditions with the walls of the sagger active similar to the "muffle" walls of this type of furnace. In the third stage, however, it is the general practice to provide the kiln itself as of the "muffle furnace" type. And in each stage, prior to the development of our new method, the arrangement has been such that the ware is treated under conditions of stagnant air—the use of saggers preventing air circulation, and the muffle kiln of the third stage being arranged to produce this effect.

This latter has been due to the universal belief in the trade that any attempt to circulate air in direct contact with the heated ware inherently sets up the conditions of shattering, especially within the "tender" zone, since the effect of the air would be to produce the temperature changes too rapidly to permit proper compensation to be had so that strains and stresses would be present with the result that shattering would be set up. Since the action in the third stage is more particularly upon the decorations rather than the ware, and the change from the ascending to the descending progression must take place in the "tender" zone, the ware, in this stage, is not generally enclosed in saggers since inspection would not be possible, and hence a different type of kiln has been employed from that used in the first and second stages.

Tunnel kilns have heretofore been employed in the first and second stages, the saggers being placed upon cars and the latter moved through the kiln. This type of kiln has permitted a great increase of production of "bisque" and glazed ware. But the kiln generally used in the third stage has been that known as the "bee-hive" or muffle kiln, this type having been the most successful for production purposes, under the prior methods of firing decorative ware. Kilns of the "bee-hive" or muffle type, however, lack the productive capacity of the tunnel kilns, due to the fact that they are "periodic" instead of "continuous" in action, it being necessary to first "pack" the kiln with the goods to be fired (the kiln must be at low temperature to permit the workmen to introduce the ware), the kiln then brought gradually to the peak temperature, and then allowed to cool to the temperature at which the ware can be removed from the kiln; as a result, the "pack" must undergo its complete cycle before a second "pack" can be introduced. Hence, the kiln is periodic in action, each firing cycle being limited to the time required to fire the single "pack", and being inactive during the period when one "pack" is being removed and another introduced.

Not only is production thus restricted, but the conditions of operation provide another disadvantage—aside from the large cost of fuel—due to the fact that the walls of the muffle are first subjected to the increasing temperature action, and then to the decreasing temperature activity, this being required with each "pack". The muffle walls are themselves subject to expansion and contraction, and because of this there is a tendency for the products of combustion to leak through the muffle walls into the firing chamber, thus introducing gases into this chamber such as tend to deteriorate the product. In the first and second stages, such leakage—through the walls of the saggers—if extensive, tends to change the color of the ware itself; in the third stage it materially affects the appearance of the colors in the decorations.

The effect of the change in direction of temperature-progression with the peak temperatures within the "tender" zone, was made strikingly manifest during the earlier periods of the development of the present invention. The primary purpose had been that of setting up the conditions of continuous instead of periodic firing in the third stage, and to provide this result a kiln of the tunnel type and operating under muffle-furnace conditions was built, the kiln being equipped to provide for the gradual development of the temperature increasing and decreasing progressions and to provide the necessary heat conditions within the tunnel through which the ware was passed. Following the universal practice, the kiln was arranged to provide the firing cycle under conditions of substantially-stagnant air. One of the desired results was obtained—a decrease in the cost of heating the kiln as compared with the prior practice of use of the "bee-hive" type of kilns (the fuel cost dropping to approximately 50% of the previous cost in this respect). But the operation of the kiln developed another result—the great quantity of ware which was shattered; since this ware had passed through the first and second stages to prepare it for the decorative stage, the shattering of the ware not only involved great financial loss, but the quantity of acceptable ware coming from the kiln was materially reduced from that which would come from the "bee-hive" or muffle type of kiln. Experiments of various kinds were tried with a view to break down the conditions of shattering, but no satisfactory results were secured, such as would give assurance of profitable operation.

The seeming failure led to thoughts of abandonment of the idea, taking down of the kiln and reverting to the practice of the "bee-hive" type of kiln which was in general service. The large cost of installation of the tunnel kiln and a wish to prevent this loss if possible, led to the thoughts of conducting an additional experiment, that of trying out the effects of firing the ware in the presence of circulating air instead of in stagnant air; the universal opinion of the experts of the art was directly against a successful outcome—opinions given when the idea was being considered. It was, however, decided to make the experiment, since the losses could not exceed those then present, and it would simply delay the taking down of the kiln.

For the experiment an inlet for air was made adjacent the discharge end of the kiln, and openings for the escape of air made adjacent the entrance end of the kiln and leading to the stack; to the air inlet was secured a power fan capable of delivering a sufficient quantity of air at room temperature at the discharge end of the kiln to set up the conditions of air circulation in a direction opposite that of the travel of the ware through the tunnel and practically throughout the length of the tunnel. It was found that the proper kiln temperatures could be obtained with the air so circulated, and the carriers for the ware were sent through in the manner originally contemplated, and finally the ware-filled carriers were carried through. Instead of the shattering effect which was to be expected from the teachings of the trade, the prior shattering conditions were practically eliminated. The change in direction of temperature progression was produced within the "tender" zone, and the ware was being bathed with flowing air throughout the travel of the ware through the tunnel but shattering did not occur, and it was found that a superior product in decoration was secured. With the experiment proven a success in this way, certain changes were made to provide for meeting conditions of expansion of air and to provide for more efficient circulation of air through the ware itself, and the kiln placed in regular operation.

As pointed out in the method application, the effects produced come through the fact that the difference in temperature between the air and the ware is kept within practically definite limits on any cross-section of the kiln. The entering air is of a temperature below that of the ware at this portion of the kiln and retains this relation until the peak zone is reached. The air is travelling in the direction of increasing temperatures and becomes heated during travel through heat exchange with the ware, this exchange acting to cool the ware; since the ware travels in one direction, each successive increment of air reaches a particular cross-section of the kiln at substantially the same temperature, and is brought into contact with successive increments of ware— also of substantially but similar higher temperature—so that the heat exchange conditions at this cross-section are substantially constant. The travelling air of gradually-increasing temperature is moving in the direction of ware of gradually-increased temperature, while the travelling ware of gradually-decreasing temperature is moving in the direction of air of decreased temperatures.

As the portion of the kiln having the peak temperatures is approached, this difference between the temperatures of the ware and air gradually decreases until at the peak-zone there is a point where the temperatures are substantially the same. As a result, the presence of flowing air at the point where the change in direction of temperatures of the ware takes place, does not set up any material temperature variation between the ware and the flowing air, and the change in direction can take place without setting up the conditions of excessive stress and strains.

Beyond the peak zone, and on the side of that zone in which the ware is being heated, the temperature relation between the ware and air is reversed, the flowing air being of the higher temperature, with the result that the heat exchange is from the air to the ware to aid in heating the ware—the subsequent changes in the kiln were designed to maintain this condition through providing a circulation path for the air which would tend to set up heat exchange from the walls of the kiln in favor of the air, so as to maintain the air at any cross-section of the kiln at this higher temperature. The gradually-decreasing temperature air is thus travelling in the direction of ware of gradually-decreased temperatures, while the gradually-increasing temperature ware is travelling in the direction of air of gradually increased temperature.

As a result, the air on the ascending temperature side of the travel path of the ware is aiding the kiln in heating the ware, while on the descending temperature side of the travel path of the ware the air is aiding the natural cooling action to cool the ware. But the effect of the presence of the air has been to provide a more uniform rate of temperature-progression than before, thus tending to set up the characteristics of regulation in this respect.

The object of the present invention is, therefore, to provide an apparatus such as will permit the carrying out of the process above described, and capable of providing the firing cycle in such manner as to permit of maximum efficiency in operation, relatively large production, low cost of operation, and in obtaining the results by the use of a kiln structure of comparatively short length to provide for relatively low cost of installation.

To these and other ends, therefore, the nature of which will be more fully understood as the invention is described, the invention consists in the improved construction and combinations of parts hereinafter more fully described, illustrated in the accompanying drawings, and more particularly pointed out in the appended claims.

In the accompanying drawings, in which similar letters of reference indicate similar parts in each of the views,—

Figure 1 is a top-plan view, semi-diagrammatic in type, of an installation adapted to carry out the general principles of the invention;

Fig. 2 is a perspective view of an installation of the type of Fig. 1, the view showing more particularly the ware-introducing end of the kiln, parts being broken away to more clearly illustrate parts of the invention;

Fig. 3 is a perspective view illustrating the ware-removing end of the kiln;

Figs. 4 and 4ª combinedly present a view partly in plan and partly in horizontal section of one form of kiln structure proper;

Figs. 5 and 5ª combinedly present a longitudinal section of the kiln shown in Figs. 4 and 4ª;

Fig. 6 is a cross-sectional view taken on line 6—6 of Fig. 4;

Figs 7 and 8 are cross-sectional views taken on lines 7—7 and 8—8, respectively, of Fig. 4ª;

Figs. 9 and 9ª combinedly present a view partly in plan and partly in horizontal section of a modified form of the kiln structure proper;

Figs. 10 and 10ª combinedly present a longitudinal section of the kiln shown in Figs. 9 and 9ª;

Figs. 11 and 12 are cross-sectional views taken on lines 11—11 and 12—12, respectively, of Fig. 9;

Figs. 13 and 14 are cross-sectional views taken on lines 13—13 and 14—14, respectively, of Fig. 9ª, and Figs. 15, 16 and 17 are views respectively in vertical longitudinal section, plan and cross-section, of a preferred form of ware carrier.

Figure 1 is first briefly described to permit a general understanding of the lay-out of the installation.

The kiln is of the tunnel type of sufficient length to permit completion of the desired cycle, the kiln having a trackway extending throughout its length for the passage of wheeled ware-carriers or cars. For the purpose of explanation, A indicates the portion of the kiln in which the travel of the ware is through the ascending-temperature progression of the cycle, B indicates the portion in which the ware travels through the descending-temperature progression, and C the intermediate portion containing the furnace or heat-generating portion, this portion also containing the peak-temperature zone of the ware travel path. The opposite ends of the kiln are provided with vestibule portions, a and b, the former being at the entrance end of the kiln and the latter at the discharge end.

The travel path of the ware-carriers or cars is arranged in such manner as to set up the general conditions of an endless path; this may be of any desired arrangement, that shown, presenting a trackway D, external of and parallel with the trackway within the kiln, the vestibules a and b containing transfer cars designed to be shifted or "shuttled" between the similar ends of the two trackways, the carrier in vestibule a being designed to receive a loaded car from trackway D and place it in alinement with the track within the kiln, while the carrier in vestibule b receives a car from the discharge end of the kiln and delivers it in alinement with the opposite end of trackway D.

The vestibule cars are arranged to have their movements in unison, so that both are in alinement with the trackway concurrently; when in such alinement, advancing mechanisms operating in the direction of length of the tracks, permit the ware-carriers or cars on the tracks to be advanced the distance of one car. For instance, if the vestibule carriers are in alinement with the kiln track, and the carrier in vestibule a contains the car to be added, the transfer car vestibule b being empty, the advancing mechanism would move the entire train of cars by pushing on the one then located on the carrier of vestibule a, thus placing the car in vestibule a within the kiln, and moving the car at the other end of the kiln on to the transfer car in vestibule b. The transfer cars are then shifted into alinement with trackway D, and the advancing mechanism is made active on the ware-carrier or car then on the transfer car of vestibule b to advance the train on trackway D a distance sufficient to discharge the load of the transfer car of vestibule b—this advance placing the leading car of the train in position on the transfer car of vestibule a. Shifting of the transfer cars to their positions within the vestibules then sets the system in condition for the succeeding cycle of ware-car transfer to and from the kiln.

The vestibules are separated from the kiln by doors E, and E', these being slidable vertically between positions to obstruct or to clear the ware-carrier travel path, and are normally closed or in obstructing position, being moved to the opposite position only during the period when movement of the cars on the kiln track is to be had. In this way the disturbance of air circulation and heat losses are reduced to a minimum, it being understood that the car movements are provided periodically, at regular intervals of time—five minutes apart, for example, this particular time being illustrative only, the actual length of each period of rest between carrier movements being readily determined by experiment, and, when found, being put into regular practice.

The ware-carriers or cars are loaded and unloaded while on trackway D, the loaded cars moving toward the left in Fig. 1, the cars having the fired ware being unloaded at the right of Fig. 1, thus leaving the cars in condition to be loaded.

The advancing movements of the trains of carriers may be provided in any suitable way, the installation heretofore referred to using plunger pushers, operated by air or liquid by suitable means, not specifically illustrated, the pusher for the kiln train being indicated at F, and that for the trackway D being indicated at F'. The vestibule transfer cars are also moved back and forth between their positions, by suitable means, which may be similar to those referred to, and for illustration, these are indicated at $F^2$ and $F^3$, the former operating in connection with the car of vestibule a, the latter with the car of vestibule $b$, additional pushers may be employed, if desired. If desired, and this is preferred, the movements of these advancing instrumentalities can be controlled from a single point—indicated in Fig. 1, at G, an electrical control system being utilized for the purpose in the particular installation, but other systems can obviously be employed. If desired, the control of the movements of doors E and E' can be included within the system.

We are aware, of course, that we are not the first to utilize the idea of two parallel tracks, one within an oven and the other outside the oven, with the arrangement such as to permit transfer of the advance car of the train on one track to a position at the rear of the train on the other track; the present invention includes this broad idea, using it by arranging the control in such manner that while the movements of the transfer cars of the vestibules is concurrent, the movement of the trains is alternate, the movement of the external train taking place during the period of dwell of the internal train.

The unit or instrumentality for introducing the air for circulation through the kiln is indicated in Figure 1 at H, this being shown as introducing the air adjacent the door E', thus introducing it at the coolest portion of the section B of the kiln, the point where the ware is ready to be passed into the vestibule $b$.

As shown in Figure 1, J indicates an instrumentality designed to introduce air to the furnace, the unit being designed to supply air at room temperature, indicated by pipe $j$, and air that is heated, this being indicated by pipe $j'$ which is connected with a heating chamber in the upper portion of section B overlying the cooling chamber for the ware, the heat of the latter serving to preheat the air passing through pipe $j'$. If desired, air for the latter can be supplied from unit H.

As will be understood, the number of ware-carriers, indicated at K, for instance, used in an installation such as described, is sufficient to fill both the internal and the external trackways with the addition of one carrier which is located on the transfer car of either of the vestibules, depending upon the particular portion of the cycle; it may be on the car of vestibule $a$ while the car is in alinement with trackway D at the close of the advancing movement on said trackway, or in the vestibule awaiting advance into the kiln; or it may be present on the transfer car of vestibule $b$ within the vestibule at the close of the advancing movement on the internal trackway, or in alinement with trackway D prior to advance of the train on the latter trackway.

The ware-carriers K may be of any desired construction, a simple form, shown in Figs. 11 to 17, being in the form of a slab formation $k$ of material capable of withstanding the high temperatures, this slab being mounted on a wheeled support $k'$, the slab carrying side plates $k^2$ adapted to cooperate with a sand seal formation of usual type to prevent the escape of heat from the firing chamber of the kiln. The slab also carries a plurality of supporting plates $k^3$ spaced apart in horizontal planes by suitable means such, for instance, as spacers $k^4$, the plates being adapted to carry the ware, and being preferably of a spider-type, to permit ready circulation of heat and air therethrough.

The vestibules may be of any desired type capable of permitting the movements of the ware-carriers through the cycle referred to, but, for the purpose of simplicity and durability in construction and ready operation, we prefer a construction such, for instance, as is disclosed in Figs. 2 and 3, these representing the vestibules at the opposite ends of the kiln, and being more or less similar in structure and arrangement, Fig. 2 illustrating the structure with the transfer car in its outer position, Fig. 3 illustrating the car as housed.

As shown in Fig. 2, for instance, the vestibule body 20 is shown as having a rear wall $20^a$, end wall $20^b$, and top $20^c$, these forming the top and two of the vertical walls of the vestibule. The door E opposite wall $20^b$, serves as a movable wall, the fourth wall, $20^d$, being carried by the transfer car and being movable with the latter between the positions the car assumes; as shown in Fig. 2, this brings the wall or door $20^d$ to a position in front of the plane of the trackway D, or, as shown in Fig. 3, the wall or door completes the vestibule. The tracks 21 for the carrier extend below the wall or door, as shown.

The transfer car, indicated in Figures 1 and 2 at 22, is in the form of a wheeled truck carrying track sections $22^a$, so positioned on the truck that when the latter is in either of its two positions, the tracks will align with the tracks of the internal trackway through the tunnel or the external trackway D, depending upon the position. In such positions of alinement, the tracks $22^a$ may receive a ware-carrier K from or deliver it to either of the trackways during train movement through the activities of the advancing mechanisms.

The vestibules are formed of suitable material, as for instance sheet metal properly braced and framed to provide for minimum leakage conditions when closed—although this is not absolutely essential; and the framing may include a skeleton frame 23 which travels with and is carried by the wall $20^d$ and the car 22. If desired, peep holes $20^e$ may be provided. Top 20ᶜ may carry an outlet connection 20ᶠ leading to the stack or to a conduit of the kiln leading to the stack, the purpose being to permit escape of heated air from the vestibule to the stack instead of the room—it being understood that when door E is raised to permit the carrier K to be added to the train in the kiln, this action opens the vestibule to the interior of kiln for a short period; at the ware-discharge end of the kiln this condition is not materially present since the circulation of air is in a direction away from this vestibule, but vestibule $a$ is at the opposite end of the circulation path in the kiln, and the heated air may enter vestibule $a$ when door E is raised.

The drawings disclose two forms of kiln structures which may be employed, these differing mainly in structural details, but having similar general characteristics. The vestibules are more or less similar in the two forms, and need not be disclosed in detail other than above set forth, the difference being mainly in the kiln proper. One of these forms is disclosed in Figs. 4, 4ª, 5, 5ª and 6 to 8, the other being shown in Figs. 9, 9ª, 10, 10ª and 11 to 14.

Referring first to the form shown in Figs. 4 to 8, the description will use the heat generating section C as the starting point and lead first into section A, and then into section B, thus following the cycle of the ware travel. It may be noted, that the masonry of the kiln is preferably spaced from the floor line (Figs. 6 to 8) the framing, made up of vertical buckstays 25 and horizontal beams 25ª, providing the support for the masonry and for the tracks 26 on which the ware-carriers or cars K travel through the kiln. This leaves the lower portion of the car exposed to external atmosphere, the sand seal structure 27, within which member $k^2$ of the car travels, acting to prevent generally the escape of heat into the open space thus formed.

In the particular embodiment of the heat generating section shown in this form, the fuel used is that of oil, suitable burners (not shown) extending through tuyère openings 30ª of a pair of combustion chambers 30, located on opposite sides of the firing chamber, as indicated in Fig. 4ª, this view indicating generally a horizontal section of the masonry structure, Fig. 7 showing, at the right, a vertical section of the masonry. As shown, the combustion chamber 30 is enlarged for the purpose of providing for proper admixture and combustion of oil and air—the air supply being indicated generally at J in Fig. 1—each chamber leading into a pasageway 31, the inner wall of which, at this point, is provided by an elongated slab 32 of suitable material, which slab, in practice, will be made in large sections (not shown), formed to fit closely together and form, in effect, a continuous slab, a preferred material being carborundum, this material permitting of proper shaping when being formed, and being able to withstand the high temperatures which are developed; in addition, it permits of producing a wall, which is here described as the muffle wall, of an extended length, thus eliminating the requirement of a comparatively large number of joints in the length of this wall as the sections comprising this slab may be comparatively large, this being of especial advantage in that possibility of leakage of products of combustion from the passages 31 into the firing chamber is materially reduced; another advantage is found in the fact that the wall can be made comparatively thin, thus permitting of better heat exchange and radiation action.

As an example, sectional slab 32, in one installation, has a length of approximately thirty-nine feet, and a thickness of between two and three inches, and a width of approximately two feet. As will be understood, this arrangement will provide for rapid heat conduction rather than heat storage, with the result that the desired temperature conditions within the tunnel will result, the heat exchange with the air—presently referred to in detail—being more uniform, due to the fact that the heat exchange with the products of combustion in passages 31 becomes effective with rapidity, so that the temperature of the slab at any particular zone remains approximately constant in presence of constancy in the temperatures of the products of combustion.

As shown in Figs. 4, 4ª and 7, the slabs 32 are mounted in the masonry in such manner as to provide for expansion at the ends and the top, the arrangement being such as to limit the possibility of leakage of products of combustion past these points.

The vertical muffle wall beyond the slab 32, is of suitable material, being referred to herein as "masonry", the latter term being used as inclusive of the various materials which go to make up walls of kilns, etc. As shown in Fig. 4, this portion of the muffle wall, indicated at 32ª, increases in thickness toward the end of passage 31, this increase being shown as in the form of zones, thus tending toward the conditions of heat storage. The outer vertical wall of passage or flue 31 is of masonry. It will be understood, of course, that the temperature of the products decreases as it traverses the flue. In the installation referred to, the flue is approximately fifty feet long, and during its travel to the exit end, the gases forming the products of combustion, lose the major portion of the heat with which they leave the combustion chamber 30. The products of combustion, after traversing the flue 31, leave the flue through a passage 31ª (Fig. 6) to a flue chamber 33 above the top muffle wall 34, chamber 33 leading to a stack 35, the latter being located sufficiently far from the end of the kiln to permit the control of the discharging air into chamber 33 as presently described, the stack being arranged to provide the proper draft.

As shown in Figs. 5, 5ª, 6 and 7, the top muffle wall 34 is of masonry, of generally uniform thickness from the zone of the combustion chamber to approximately the point where the wall 32ª is thickened; beyond this point the wall 34 is of increased thickness to the end of the kiln. The wall may be curved in cross-section, as at the right in Fig. 6, or it may be flat, the installation referred to employing both forms, but at different points, as indicated.

As shown in Figs. 4 and 6, this wall 34—which may be considered as the roof of the firing chamber—is provided with a plurality of openings 34ª, these being located along the center of the roof and along the sides—the latter leading from the bottom of the tunnel (Fig. 6)—being preferably arranged in staggered relation as indicated. These openings afford communication between the tunnel and the flue chamber 33, and each is controlled by suitably dampers 34ᵇ, so that any opening may be closed or reduced as to exposed area, as may be found essential. Openings 34ª form the outlets for the air from the tunnel, and act somewhat to control temperatures in the earlier part of the ware travel path, it being readily understood that the air, under pressure, is forced toward this end of the tunnel, and will escape wherever permitted; if a portion be permitted to escape at the opening at the right in Fig. 5, the flow beyond this point will be different from what it would be if the air were all required to pass through the opening at the left in Fig. 5, with the result that the effect of the air on the ware will be changed. Advantage is taken of this fact to permit of the production of a more uniform rate of temperature-increase at this portion of the firing chamber.

In addition, the side walls 32 and the top wall 34, are preferably provided with baffles 36 on their inner faces, these being preferably arranged in staggered relation; the baffles may be formed integral with the wall or separate therefrom. The baffles project from the wall surface a distance sufficient to tend to cause the flowing air to travel in somewhat of a sinuous course through this portion of the kiln, it being understood, of course, that the train of cars occupies the major portion of the space within the tunnel, so that the free space for direct advance of the air through the chamber is restricted. These baffles serve the double purpose of causing the air to travel toward the inner face of the walls 32, and to cause the air to circulate through the ware on the cars. By being brought into contact with the walls 32 the air becomes heated through heat exchange action, this heat being delivered to the ware as the heated air circulates through the ware in following its sinuous course; as a result, the ware at all parts of the car is subjected to the flowing air and the heat within it, thereby eliminating the conditions of zones differing materially as to temperature values within the ware carried by the car.

An additional feature in section A of the kiln is that which presents a variation in cross-sectional dimensions of the tunnel. As shown in Fig. 4, the space between the car and the wall 32ª at the entrance end of the kiln, is comparatively small, thus forcing the air through the car. As the car advances, the width of this space increases until the zone of wall 32 is reached, this spacing continuing until wall 32 approaches the combustion chamber zone (Fig. 4ª), where the wall and the masonry are gradually carried inwardly until the initial spacing is again reached, this latter being reached as the combustion chamber zone is left behind by the advance of the car into section B. This arrangement changes the cross-sectional dimensions of the tunnel, and is provided to compensate for the expansion of the air while within the heating section A, and thus control somewhat the rate of advance of the air through this portion of the tunnel. As the volume of air admitted per unit of time is constant, and the cross-sectional dimensions of the cooling chamber of section B are substantially constant, it will be understood that the rate of advance of the air through the tunnel is determined mainly by this portion of the tunnel; this rate would be increased in the firing section under expansion action, if these dimensions were continued, and thus reduce the value of the heated air and the continued re-heating heretofore described, because of the increased travel speed; the increase in dimensions referred to, thus tends to compensate for expansion and to retain the tendency to sinuous travel of the air through the heating chamber.

The cooling section B is of approximately equal length to that of section A. Its cross-section is preferably divided into four zones, $b'$, $b^2$, $b^3$ and $b^4$, in the direction of advance of a car through the kiln; zones $b^2$ and $b^3$ are illustrated respectively in Fig. 8, the former at the left, the latter at the right, differing mainly in the thickness of the masonry at the side and the dimensions of the air-preheating chamber 37. Zone $b'$ has the same side wall thickness as zone $b^2$ in Fig. 8, but omits the chamber 37, as shown in Fig. 5ª, thus decreasing the vertical height of the kiln as compared with the succeeding zones. As shown in Fig. 4ª, the width of chamber 37 is increased in zone $b^2$ as compared with zone $b^3$, thus compensating for expansion of air brought about by the raising of the air temperature produced as presently described. Zone $b^4$ is the discharge end zone of the kiln, and the side walls differ in that they carry structures designed to permit air to be discharged into the tunnel, these being connected up with the unit H. Unit J is connected with the preheating chamber 37.

In connection with section B, it will be understood that air at room temperature is introduced in zone $b^4$, being introduced under pressure by unit H, and since the only outlet is found in the entrance portion of section A, it will be understood that the air is compelled to travel throughout the length of the tunnel, the constant supply of air forcing this continuous travel within the tunnel itself, with the direction of travel directly opposite or counter to the travel of the ware cars. The condition is thus presented of temperatures at substantially opposite ends of the section, the ware, as it leaves section C being substantially at the peak temperature, and the air at zone $b^4$ being at substantially room temperature. But within this section, the air is always of lower temperature than the ware, so that conditions of heat exchange between the ware and air are present throughout the section, with the difference in temperature values between air and ware in a cross-sectional zone substantially constant and the rate of change in temperature values substantially uniform through a succession of zones. This will be understood from a brief description of the operation.

Since the delivery of air into the tunnel is constant and at uniform rate, the travel of air through the section is also at a substantially constant rate of advance through the section. And this is true with respect to the ware travelling in the opposite direction, although the ware is advanced intermittently instead of continuously—the advance of the cars is at regular periods and at uniform speed. As will be understood, the ware car within zone $b^4$ has its ware at the lowest temperature of the ware of the cars in this section—the zone is farthest removed from section C and no means are provided for maintaining temperature so that even under natural cooling action, the ware is coolest in this zone; its temperature, however, is somewhat above room temperature. Hence, the entering air is brought into contact with ware of higher temperature, setting up the conditions for heat exchange, lowering the temperature of the ware and raising that of the air. As the air passes on it contacts with the ware of the succeeding car, but at this time the temperatures of ware and air are above those within the zone $b^4$, so that the same heat exchange activity is present, the ware being bathed with air heated by the ware of the car with which it had been previously in contact. This action continues as the air advances, the air constantly gaining increments of heat units as it baths succeeding ware cars, until it approaches section C where it becomes subject to the additional action set up by the furnace structure, the latter thus rapidly raising the temperature of the air to that of the ware.

While the difference in temperature of the ware as it leaves section C—the peak temperature—and that of the air at zone $b^4$ may be as much as 1400° F., yet the difference in temperature between the ware and air in proximity to section C will not exceed 200° F., due to the heat exchange action which takes place during travel between the ends of section B. This heat exchange condition raises the temperature of the air more rapidly and lowers the temperature with greater rapidity than is possible under natural cooling, but without providing any sudden or extremely rapid change in temperatures such as would produce "shattering" of the ware. As a result, the length of the cooling section B below that required for natural cooling is considerable, thus decreasing not only the construction costs, but also decreasing the length of time required in cooling.

It is unnecessary to describe in detail the specific action of the air as it advances into section A. The rapid increase in air temperature in section C, brought about by the activity of the furnace to augment that of the ware itself as a heating agent, brings the air to the peak temperature of the ware, so that at the moment when the ware changes its direction of temperature progression, the air is of substantially the same temperature as the ware. As the air continues to travel on, the action of the furnace maintains its temperature as it begins its travel through section A. Here, however, it encounters ware which is of lower temperature, and the heat exchange activity again becomes effective, the higher temperature of the air, however, causing the transfer of heat units from it to the ware, thus lowering the temperature of the air and increasing that of the ware. In order to maintain this difference, the sinuous travel of the air brings it into contact with the side walls of the muffle, thus taking up heat units from the latter, to retain the higher temperature relation of the air, the temperature values between the ware and air is retained within definite limits, as in section B. The air is discharged into chamber 33 as heretofore described, the discharging temperature being comparatively low, the heat exchange activity having reduced its temperature at an approximately constant rate as the air advanced.

As will be understood, the heat exchange condition is not limited to that between the ware and the air, this same condition being present between the air and that portion of the ware carrier or car that is within the tunnel, this condition causing the car to partake of the same general temperature-progression as is found in connection with the ware. This condition is one of the reasons for the ability to raise the temperature of the air with the desired rapidity so as to maintain the substantially definite differences in temperature between ware and air, as well as aiding in securing the approximately uniform rate of progression of temperatures in both heating and cooling sections of the kiln, the cars being of constant dimensions and thus presenting a travelling element of constant value in the heat exchange condition, leaving the ware to supply the remainder of the heat units in raising the temperature of the air. The latter has an important part in this action, as is evidenced by the change in conditions where only isolated cars of the train are filled with ware, but the car itself provides an important constant factor in producing the operating temperature conditions within the tunnel.

One effect of this air circulation in preventing "shattering" of the ware is seen in connection with the important portion of the cycle during which the increasing-progression changes to the decreasing-progression. As heretofore pointed out, this change takes place while the ware is within the "tender" zone of temperatures, the change being that which necessitates a stop in the conditions of expansion and the beginning of the conditions of contraction of the ware. The presence of the circulating air seemingly increases the length of time in which this change can take place, since the air is within the zone of activity of the furnace and beginning its rapid rise for an appreciable distance before reaching the normal peak-temperature position of the ware, thus tending to maintain the peak temperature for a short period or to delay the development of the period of the regular cooling progression by a slow development of the progression for a short period. On the other side of the peak the air, being of peak temperature, develops its loss of heat units gradually for a short distance, but tends to slightly increase the rate of progression of advancing temperature of the ware, so that the ware reaches its peak slightly in advance of the normal peak point. As a result, the peak point is changed to the conditions of a zone in which the expansion conditions end gradually instead of abruptly, and the development of the cooling cycle is also gradual instead of abrupt. Hence, the change from expansion to contraction is made without setting up conditions of sudden or abrupt change, and the ware is thus able to properly compensate for the change without setting up strains and stresses in the ware. The action seemingly has the effect of producing a brief dwell in the conditions of temperature progression conditions, and during this period of dwell expansion gradually ends and contraction gradually begins.

The general arrangement of the form shown in Figs. 9 to 14, is similar to that shown in Figs. 4 to 8, the differences being found in the details of construction. For instance, the wall 32ª is changed from the varying thickness form of Fig. 4, to a wall of uniform thickness, the variation in dimensions of the firing chamber to meet the conditions of air expansion being provided by a curved section of the wall. Top wall 34 is also changed to a wall of substantially uniform thickness, the variation in dimensions of the firing chamber being provided by an off-set arrangement.

A variation is provided in the outlet flue arrangement for the products of combustion, a succession of flues 38 being provided (Fig. 9) each leading to the chamber 33, each being controllable by a damper, thus permitting of a variable control of the discharge of the products of combustion from flue 31, permitting of a closer regulation of the temperatures in the zones of the tunnel adjacent the entrance end of the tunnel; the use of the air-outlets 34ª is continued along the median line, but the control of temperatures becomes divided between the control of the air discharge and that of the discharge of the products of combustion.

The combustion chamber section C in this form is substantially similar to that of the other form disclosed.

Section B in this form has certain structural differences over that of the form of Figs. 4 to 8. For instance, the air pre-heating section employs chamber 37 as a heating chamber 37', the air which is to be preheated being carried through the chamber in a conduit 39 which may be supplied from unit H, and is connected to the unit J. Chamber 37' is made of larger cross-sectional dimensions to permit the passage of the conduit and afford space for the air which is used to aid in the pre-heating action. A stack 40 is connected with the chamber 37'. The air for chamber 37' is obtained not only from the room through the open end of the chamber at the discharge end of the kiln, but also from channels 41 formed in the side walls of the cooling chamber, these channels being indicated in Fig. 14, and being provided by spaced rib-like portions 42, the arrangement of which is shown in dotted lines in Fig. 10ª, the channels communicating with each other and with chamber 37' at intervals, as indicated at 41ª. As a result, the preheating of the air of conduit 39 is provided not only by conduction from the roof of the cooling chamber, but additionally by the air heated by the side walls of the cooling chamber, this latter air circulating through chamber 37', the result being that not only is the conduit air more effectively heated, but the heat exchange action between the air in channels 41 and the side walls of the cooling chamber permits of a more efficient cooling action, since the heat storage action of the side walls is made less and a better regulation of the cooling rate is had.

Figs. 15 to 17 indicate generally the structure of one of the ware-carriers or cars, the insulating slab-like formation $k$ being omitted in the illustration, this formation being located between the bottom plate 43 and the spider-like plate $k^3$ spaced thereabove by spacing members $k^4$. The ware-carrying plates $k^3$ are provided with openings 44 of comparatively large number to permit of circulation of air through them, and are held in spaced relation by the spacing members $k^4$, the whole being tied together by rods 45 connecting the top plate and plate 43. Three of the plates $k^3$ are shown, each of which is designed to carry ware as indicated in Fig. 11, for instance. And as shown in this figure, the loaded car occupies nearly all of the space within those portions of the tunnel which are not arranged to take care of air-expansion, thus ensuring that the flowing air will circulate through the ware contained on the car, the greater space being adjacent the bottom of the tunnel—excepting at the expansion zones—thus taking advantage of the upward movement of the air as its temperature increases, the baffle structures within the heating section serving to bring about circulation between the upper and lower portions of the tunnel as well as laterally.

As will be understood, there are a number of advantages resulting from an installation of this kind. A number of these have been pointed out above and others are referred to in the companion application. The production is largely increased over the prior practices of bee-hive or muffle kiln firing, and the cost of operation is greatly reduced, since unskilled labor can be employed, in addition to which the fuel cost is reduced to practically 25% of that required in the bee-hive kiln installations. In practice it is found that the difference between the fusing temperatures of metal and mineral colors is immaterial, and that ware with the two types of decorations—either on the same or different pieces of ware—can be fired concurrently, with the product of superior appearance over that produced under bee-hive kiln firing, the presence of the oxygen of the air enhancing the appearance of the colors. Leakage of gases from the products of combustion are practically prevented, since the kiln is kept at substantially similar temperatures during the period of operation, and wall expansion remains constant; in addition, the use of the carborundum wall aids in this respect; but the greater preventive is found in the air pressure within the tunnel, this being approximately equal to the pressure in the flues, with the result that leakage is maintained at a minimum—and if slight leakage be present, the gases are introduced into a flowing body of air in which they are rapidly dissipated and carried off, becoming ineffective as a deteriorating agent upon the ware.

It will be understood that suitable temperature indicators and controls are employed—such as pyrometers, thermo-couples, etc.—these permitting control of temperatures by controlling the fuel, regulating dampers, etc., as may be found necessary under the information given by the indicators, etc.

While we have herein illustrated several forms which the invention may take, it will be readily understood that variations and changes may be found desirable or essential in meeting the various exigencies of use; and we desire to be understood as reserving the right to make any and all such changes or modifications as may be deemed essential or desirable, in so far as the same may fall within the spirit and scope of the invention, as expressed in the accompanying claims when broadly construed.

What we claim is:—

1. In the art of "firing" articles, a tunnel kiln formation of the muffle type, means for advancing the articles through the tunnel of the formation, and means for establishing a circulation of air within the tunnel with the air supply admission adjacent an end of the tunnel and with pressure of the air greater than that of atmospheric pressure, the air being in direct contact with the advancing articles.

2. In the art of producing ceramic ware, and wherein the ware product is completed by the activity of a "firing" cycle, a kiln formation of the muffle type for receiving the ware to be fired, means for producing the required heating and cooling temperature-progressions upon the ware within the formation, and means for establishing a circulation of air within the formation with the air supply admission adjacent an end of the formation and in direct contact with the ware substantially throughout the cycle period to produce heat exchange conditions between air and ware by the air circulation activity.

3. In the art of decorating ceramic ware, wherein the decorations are permanently affixed to the ware by the activity of a "firing" cycle, and wherein the peak temperature of the cycle is within the "tender" zone of the ware, a kiln formation of the muffle type for receiving the ware to be "fired", means for producing the required heating and cooling temperature-progressions successively upon the ware within the formation, and means for establishing a circulation of air within the formation in direct contact with the ware to produce heat exchange conditions between air and ware by the air circulation activity.

4. Apparatus as in claim 3, characterized in that the heat-source is located at the peak-temperature zone, the heat-exchange activity of travelling air and ware within the cooling zone of the tunnel is active to provide air temperatures at the entrance to the peak-temperature zone such that during air travel through such zone the heat-source activity upon the air serves to prolong the peak-temperature period to permit ware expansion to gradually end and ware contraction gradually begin when the temperature-progression changes its direction of progression.

5. In the art of decorating ceramic ware, wherein the decorations are permanently affixed to the ware by the activity of a "firing" cycle, and wherein the peak temperature of the cycle is within the "tender" zone of the ware, a kiln formation of the muffle type for receiving the ware to be "fired", means for producing the required heating and cooling temperature-progressions successively upon the ware within the formation, and means for establishing a circulation of air within the formation in direct contact with the ware substantially throughout the cycle period to produce heat exchange conditions between air and ware by the air circulation activity.

6. Apparatus as in claim 5, characterized in that the heat-source is located at the peak-temperature zone, the heat-exchange activity of travelling air and ware within the cooling zone of the tunnel is active to provide air temperatures at the entrance to the peak-temperature zone such that during air travel through such zone the heat-source activity upon the air serves to prolong the peak-temperature period to permit ware expansion to gradually end and ware contraction gradually begin when the temperature-progression changes its direction of progression.

7. In the art of decorating ceramic ware, wherein the decorations are permanently affixed to the ware by the activity of a "firing" cycle, and wherein the peak temperature of the cycle is within the "tender" zone of the ware, a kiln formation of the muffle type for receiving the ware to be "fired", means for producing the required heating and cooling temperature-progressions successively upon the ware within the formation, and means for establishing a circulation of air within the formation in direct contact with the ware substantially throughout the cycle period, with the pressure value of the circulating air greater than atmospheric pressure.

8. In the art of decorating ceramic ware, wherein the decorations are permanently affixed to the ware by the activity of a "firing" cycle, and wherein the peak temperature of the cycle is within the "tender" zone of the ware, a tunnel kiln formation of the muffle type arranged to produce the desired heating and cooling temperature-progressions within the tunnel of the formation, means for advancing the decorated ware through the tunnel of the formation, and means for bathing the ware with circulating air substantially throughout the cycle period to produce heat exchange conditions between air and ware by the air circulation activity.

9. In the art of decorating ceramic ware, wherein the decorations are permanently affixed to the ware by the activity of a "firing" cycle, and wherein the peak temperature of the cycle is within the "tender" zone of the ware, a tunnel kiln formation of the muffle type arranged to produce the desired heating and cooling temperature-progressions within the tunnel of the formation, means for advancing the decorated ware through the tunnel of the formation, and means for bathing the ware with circulating air of substantially uniform and constant pressure value during travel of the ware through the tunnel to produce heat exchange conditions between air and ware by the air circulation activity.

10. In the art of decorating ceramic ware, wherein the decorations are permanently affixed to the ware by the activity of a "firing" cycle, and wherein the peak temperature of the cycle is within the "tender" zone of the ware, a tunnel kiln formation of the muffle type arranged to produce the desired heating and cooling temperature-progressions within the tunnel of the formation, means for advancing the decorated ware through the tunnel of the formation, and means for bathing the ware with circulating air of substantially uniform and constant pressure value greater than that of atmospheric pressure during travel of the ware through the tunnel.

11. In the art of decorating ceramic ware, wherein the decorations are permanently affixed to the ware by the activity of a "firing" cycle, and wherein the peak temperature of the cycle is within the "tender" zone of the ware, a tunnel kiln formation of the muffle type arranged to produce the desired heating and cooling temperature-progressions within the tunnel of the formation, means for advancing the decorated ware through the tunnel of the formation, and means for bathing the ware with circulating air during travel of the ware within both heating and cooling temperature-progressions and with the entire supply of air passing the peak temperature zone.

12. Apparatus as in claim 8, characterized in that the heat-source is located at the peak-temperature zone, the heat-exchange activity of travelling air and ware within the cooling zone of the tunnel is active to provide air temperatures at the entrance to the peak-temperature zone such that during air travel through such zone the heat-source activity upon the air serves to prolong the peak-temperature period to permit ware expansion to gradually end and ware contraction gradually begin when the temperature-progression changes its direction of progression.

13. Apparatus as in claim 8, characterized in that the air circulating means is located to deliver air to the tunnel adjacent the ware-discharge end of the tunnel and discharge it from the tunnel in proximity to the ware-entrance end of the tunnel.

14. Apparatus as in claim 8, characterized in that the air admission and discharge to the ware tunnel are so located as to cause movement of air and ware within the tunnel in a direction such as to produce the conditions of relative heat exchange substantially throughout the period of travel of the ware in contact with the air the activity of the heat-generating source on the air and ware temperatures causing the temperature of air and ware to be approximately equal within the peak temperature zone.

15. In the art of "firing" articles under production capacity conditions, a tunnel kiln formation of the muffle type arranged to produce heating and cooling temperature-progressions within the tunnel of the formation, said tunnel having a trackway for the passage of the articles through the tunnel, an external trackway whereon the articles to be "fired" are assembled in increment relation and the "fire" articles removed, transfer means for moving increments of articles between the trackways, means for advancing the articles on both trackways, and means for establishing a circulation of air within the tunnel to bathe the increments of articles with circulated air to produce the conditions of heat exchange between articles and air during the travel of the increments of articles within the heating and cooling portions of the tunnel, the air supply admission being adjacent an end of the tunnel.

16. Apparatus as in claim 15, characterized in that the air is circulated under a pressure value exceeding that of atmospheric pressure.

17. Apparatus as in claim 15, characterized in that the circulation of air is from the cooling to the heating portions of the tunnel.

18. Apparatus as in claim 15, characterized in that the air is admitted to the tunnel in proximity to the article-discharge end and is discharged in proximity to the article-admission end of the tunnel.

19. Apparatus as in claim 15, characterized in that the air is admitted to the tunnel in proximity to the article-discharge end and is discharged in proximity to the article-admission end of the tunnel, and with the circulating air at substantially uniform and constant pressure of a value greater than atmospheric pressure.

20. Apparatus as in claim 15, characterized in that the transfer means is active concurrently at the opposite ends of the trackways, and includes a wall movable between positions spaced by a zone alined with the outer trackway.

21. Apparatus as in claim 15, characterized in that the transfer means is active concurrently at the opposite ends of the trackways, and includes a wall movable between positions spaced by a zone alined with the outer trackway, with the movement of the means similar in direction at both of such ends.

22. Apparatus as in claim 15, characterized in that the transfer means is active concurrently at the opposite ends of the trackways, and includes a wall movable between positions spaced by a zone alined with the outer trackway, with the movement of the means similar in direction at both of such ends, activity of the advancing means for the increments on the trackways being alternately on the trackways and during periods when the transfer means is at rest.

23. Apparatus as in claim 15, characterized in that the transfer means movements are limited to movement between positions in alinement with the ends of the trackways and that activity of the advancing means for advancing movements of the increments on a trackway are provided when the transfer means is in alinement therewith at both ends of the trackway, said transfer means including a wall movable between positions spaced by a zone alined with the outer trackway.

24. In the art of producing ceramic ware, and wherein the product is completed by the activity of a "firing" cycle, a tunnel kiln formation of the muffle type arranged to produce heating and cooling temperature-progressions within the tunnel of the formation, said tunnel having a trackway therethrough, an external trackway adjacent the formation, said trackways being adapted to receive a plurality of ware-carrying cars and permit travel of a succession of such cars thereover, the number of such cars being greater by one than the number required to concurrently fill both trackways, a vestibule at each end of the kiln formation and adapted to form extensions of the tunnel, transfer means at each end of the tunnel and movable between a position within the corresponding vestibule and the corresponding end of the external trackway, said transfer means being active to receive a car from one trackway and deliver it in alinement with the other trackway, said transfer means including a wall of the vestibule movable between positions spaced by a zone alined with the outer trackway, means for advancing the cars on said trackways and to position a car on or remove a car from a transfer means, means for establishing a circulation of air within the tunnel to bathe the cars and ware carried thereby with circulated air while the cars are within the heating and cooling portions of the tunnel, and means operative to substantially isolate the vestibule extensions from the tunnel and its circulating air during periods when the transfer means is away from position in alinement with the tunnel trackway.

25. Apparatus as in claim 24, characterized in that the air circulating means is active to circulate the air with a substantially uniform and constant pressure value greater than the value of atmospheric pressure.

26. Apparatus as in claim 24, characterized in that the air for circulation is admitted to the tunnel adjacent the car outlet end of the tunnel and is discharged from the tunnel in proximity to the car-inlet end of the tunnel.

27. Apparatus as in claim 24, characterized by control means adapted to produce concurrent movements of the opposite transfer means.

28. Apparatus as in claim 24, characterized by control means adapted to produce concurrent movements of the opposite transfer means, the direction of movement of the transfer means being similar at both ends of the tunnel.

29. Apparatus as in claim 24, characterized by fluid-pressure actuated pushers for providing the movements of the transfer means and the advancing movements of the trackway are provided by fluid-pressure actuated pushers.

30. In tunnel kiln formations for "firing" ceramic ware, wherein the tunnel is provided with a trackway for the movement of laden cars through the tunnel, a tunned formation of the muffle type arranged to produce a cycle of heating and cooling temperature-progressions within the length of the tunnel with the peak temperature zone at an intermediate point in the length of the tunnel, a vestibule formation at each end of the tunnel, and means for establishing a circulation of air within the tunnel to bathe the car content with the circulating air while within both temperature-progression portions of the tunnel to produce the conditions of heat exchange between the car contents and the air by the circulating movements of the air.

31. A formation as in claim 30, characterized in that the air circulating means is active to circulate the air at substantially uniform and constant pressure.

32. A formation as in claim 30, characterized in that the air circulating means is active to circulate the air at substantially uniform and constant pressure, with the pressure value exceeding that of atmospheric pressure.

33. In tunnel kiln formations for "firing" ceramic ware, wherein the tunnel is provided with a trackway for the movement of laden cars through the tunnel, a tunnel formation having a heat-generating unit located external of and at an intermediate peak temperature zone of the length of the tunnel, that portion of the formation between said unit and the car entrance end including a structural formation of "muffle" characteristic with the inner muffle wall heated by products of combustion from the unit to produce an ascending temperature progression during car advance to the peak-temperature zone, the portion of the tunnel beyond the peak-temperature zone being adapted to produce a descending temperature-progression during car advance to the car exit end, and means for establishing a circulation of air within the tunnel to bathe the car content with the circulating air while such content is within both temperature-progression portions of the tunnel to produce the conditions of heat exchange between the car contents and the air by the circulating movements of the air, the air supply admission being adjacent an end of the tunnel.

34. Apparatus as in claim 33, characterized in that the air circulating means is active to cause air movement within the tunnel at a substantially uniform and constant pressure, with the pressure value greater than that of atmospheric pressure.

35. In tunnel kiln formations for "firing" ceramic ware, wherein the tunnel is provided with a trackway for the movement of laden cars therethrough, a tunnel formation of the muffle type having a heat-generating unit external of the tunnel and located approximately midway of the length of the tunnel, that portion of the formation between the unit and the car-entrance end including a structural formation to provide a products of combustion flue leading from the unit toward such end on opposite sides of and separated from the tunnel with the products discharged from the flue remote from the unit to produce an ascending temperature-progression having its peak temperature in the zone of the unit for the advancing car, the tunnel structure beyond the peak temperature zone permitting cooling of the car content with a descending temperature-progression to the car-exit end of the tunnel, and means for establishing a circulation of air of substantially uniform and constant pressure value within the tunnel to bathe the car content with the circulating air while the latter is within both temperature-progression portions of the tunnel to produce the conditions of heat exchange between the car contents and the air by the circulating movements of the air, the air supply admission being adjacent an end of the tunnel.

36. Apparatus as in claim 35, characterized in that the air is admitted to the tunnel in proximity to the car-exit end of the tunnel and is discharged from the tunnel in proximity to the car entrance end of the tunnel.

37. Apparatus as in claim 35, characterized in that the air is admitted to the tunnel in proximity to the car-exit end of the tunnel and is discharged from the tunnel in proximity to the car entrance end of the tunnel, with the pressure value of the air greater than atmospheric pressure.

38. Apparatus as in claim 35, characterized in that the wall interposed between a products of combustion flue and the tunnel includes sections differing in thickness of the wall.

39. Apparatus as in claim 35, characterized in that the wall interposed between a products of combustion flue and the tunnel includes sections differing in thickness of the wall, with the thinner wall section extending from the heat-generating unit in the direction of advance of the products of combustion.

40. Apparatus as in claim 35, characterized in that the wall interposed between a products of combustion flue and the tunnel includes sections differing in thickness of the wall, the thinner wall section being of carborundum material.

41. Apparatus as in claim 35, characterized in that the wall interposed between a products of combustion flue and the tunnel includes sections differing in thickness of the wall, the thinner wall section being in the form of a slab of carborundum material.

42. Apparatus as in claim 35, characterized in that spaced baffles project from the normal planes of walls of the ascending temperature-progression portion of the tunnel to additionally produce conditions of lateral circulation of air within this portion of the tunnel.

43. Apparatus as in claim 35, characterized in that spaced baffles project from the normal planes of walls of the ascending temperature-progression portion of the tunnel to additionally produce conditions of lateral circulation of air within this portion of the tunnel, the baffles being arranged in staggered relation.

44. Apparatus as in claim 35, characterized in that the cross-sectional dimensions of the tunnel are increased within the ascending temperature-progression portion of the tunnel to compensate for air expansion within this portion of the tunnel.

45. Apparatus as in claim 35, characterized in that the cross-sectional dimensions of the tunnel are increased within the ascending temperature-progression portion of the tunnel to compensate for air expansion within this portion of the tunnel, spaced baffles projecting from the normal planes of walls of this portion of the tunnel to produce conditions of lateral circulation of air therein.

46. Apparatus as in claim 35, characterized in that the cross-sectional dimensions of the tunnel are increased within the ascending temperature-progression portion of the tunnel to compensate for air expansion within this portion of the tunnel, spaced baffles projecting from the normal planes of walls of this portion of the tunnel to additionally produce conditions of lateral circulation of air therein, with the baffles arranged in staggered relation.

47. In tunnel kiln formations for "firing" ceramic ware, wherein the tunnel is provided with a trackway for the movement of laden cars therethrough, a tunnel formation of the muffle type arranged to provide an ascending and a descending temperature-progression within the travel path of a car through the tunnel with a peak-temperature zone dividing the progressions, a heat-generating unit external of the tunnel at the peak-temperature zone, flues extending from the unit within the walls of the ascending temperature-progression portion of the formation, flow of the products of combustion through the flues being active in the production of such progression within the tunnel, means for establishing a circulation of air of substantially uniform and constant pressure value within both the ascending and descending temperature-progression portions of the tunnel to produce the conditions of heat exchange between the air and tunnel walls and air and ware by the circulating movement of the air, means for supplying air to the heat-generating unit to facilitate combustion therein, said means including an air-preheating formation positioned with respect to the descending temperature-progression portion of the tunnel in such manner that heat unit values given up during the progression are utilized for preheating combustion air.

48. Apparatus as in claim 47, characterized in that a conduit for the air to be preheated extends longitudinally of the kiln within a chamber above the decreasing temperature-progression portion of the kiln and of which the top wall of the tunnel forms the bottom of the chamber with the direction of flow of the air within the conduit such as to advance in the direction of increasing temperatures within the tunnel.

49. Apparatus as in claim 47, characterized in that a conduit for the air to be preheated extends longitudinally of the kiln with a chamber above the decreasing temperature-progression portion of the kiln and of which the top wall of the tunnel forms the bottom of the chamber with the direction of flow of the air within the conduit such as to advance in the direction of increasing temperatures within the tunnel, the side walls of this portion of the tunnel carrying channels in communication with the chamber for heating air supplied to the chamber.

50. Apparatus as in claim 47, characterized in that a conduit for the air to be preheated extends longitudinally of the kiln within a chamber above the decreasing temperature-progression portion of the kiln and of which the top wall of the tunnel forms the bottom of the chamber with the direction of flow of the air within the conduit such as to advance in the direction of increasing temperatures within the tunnel, the top and side walls of the tunnel being active in heating the air within the chamber.

51. In tunnel kiln formations, wherein the tunnel is provided with a trackway for the movement of laden cars through the tunnel, a tunnel formation arranged to produce a cycle of heating and cooling temperature-progressions within the length of the tunnel, means for establishing a circulation of air within the tunnel to bathe the car content while the latter is within both temperature progression portions of the tunnel, a vestibule formation at each end of the tunnel, and means for isolating the vestibule from the tunnel at will, said vestibule having a wall movable to open the vestibule for the admission of a laden car to the vestibule preliminary to its entrance to the tunnel or for removal of a car subsequent to its discharge from the tunnel.

52. Apparatus as in claim 51, characterized in that the movable wall forms a side wall of the vestibule.

53. Apparatus as in claim 51, characterized in that the movements of the movable wall of both vestibules is concurrent.

54. Apparatus as in claim 51, characterized in that the movements of the movable wall of both vestibules is concurrent, and in the same direction.

55. Apparatus as in claim 51, characterized in that the vestibule extends below the plane of the trackway through the tunnel, the space below such plane containing a trackway leading outward from the vestibule, said latter trackway being adapted to support a transfer car having tracks adapted to form a continuation of the trackway of the tunnel when the movable wall is in its vestibule-closing position, the movements of the movable wall of the vestibule being such that the transfer car remains on the same side of the wall during movement of the car to and from its position within the vestibule.

56. Apparatus as in claim 51, characterized in that the movable wall of each vestibule is supported by a transfer structure movable into and out of the vestibule and adapted to support the laden car during movement of the latter to or from a vestibule.

57. Apparatus as in claim 51, characterized in that the vestibule extends below the plane of the trackway through the tunnel, the space below such plane containing a trackway leading outward from the vestibule, said latter trackway being adapted to support a transfer car to which the movable wall is permanently secured, said transfer car carrying tracks adapted to support a laden car and to aline with those of the tunnel trackway when the movable wall is in position to close the vestibule.

58. Apparatus as in claim 51, characterized in that the laden car is supported by a transfer car during movements of the laden car to and from position within the tunnel, the transfer car carrying a framework for supporting the movable wall of the vestibule, whereby the wall is movable with the transfer car and the transfer car is in position to permit laden car movement into and out of the tunnel when the wall is in its vestibule-closing position.

59. In the art of "firing" ceramic ware, wherein the ware is moved through a tunnel kiln structure to complete the firing cycle, and wherein the ware is bathed with flowing air circulated within the tunnel during ware travel therethrough, a ware-carrier for supporting the ware, said carrier having heat-insulating base formation above the car wheels, said base formation carrying a structure co-operating with the sand seal of the kiln to retain the heat within the tunnel, said carrier having a plurality of spaced-apart parallel plates each formed with a multiplicity openings, said plates each having dimensions to support a plurality of ware units, said plates being tied to the base portion of the carrier to form a rigid carrier structure in which the plates permit circulation of air therethrough and through the ware content on the several plates.

60. Apparatus as in claim 59, characterized in that the plates are spaced apart by tubular spacing members and are tied to the base structure by bolts passing through the plates and spacing members.

61. In the art of "firing" ceramic ware, a tunnel kiln formation arranged to produce a cycle of ascending and descending temperature-progression activity on the ware as the ware is moved through the tunnel, means for establishing a circulation of air within the tunnel with the circulation extending into both the ascending and the descending temperature-progression portions of the tunnel, and a wheeled ware-carrier structure for supporting ware units during travel through the tunnel, said ware carrier having a plurality of parallel spaced-apart plates carrying a multiplicity of openings, each of said plates being adapted to support ware units, the dimensions of the carrier and the cross-sectional dimensions of the tunnel being such that the free space between the side and top wall of the tunnel within the descending temperature-progression portion of the tunnel and the laden carrier is limited, whereby the circulating air will be circulated through the ware and plates to set up a heat exchange relation between the air and the carrier and the ware carried thereby.

62. Apparatus as in claim 61, characterized in that the pressure value of the air is substantially uniform and constant and of higher value than atmospheric pressure.

63. Apparatus as in claim 61, characterized in that the air is admitted to the tunnel in proximity to the carrier exit end of the tunnel and under pressure greater than atmospheric pressure and is discharged from the tunnel in proximity to the carrier entrance end of the tunnel.

64. Apparatus as in claim 61, characterized in that the cross-sectional dimensions of the tunnel are increased within the ascending temperature-progression portion of the tunnel to compensate for air expansion conditions within such portion of the tunnel.

In testimony whereof we affix our signatures.

CHARLES T. HOLCROFT.
CHARLES E. DOLL.